United States Patent Office 3,012,584
Patented Dec. 12, 1961

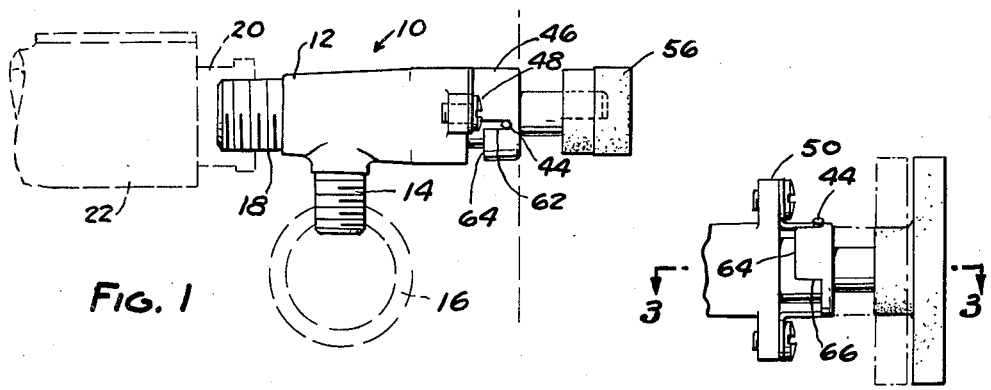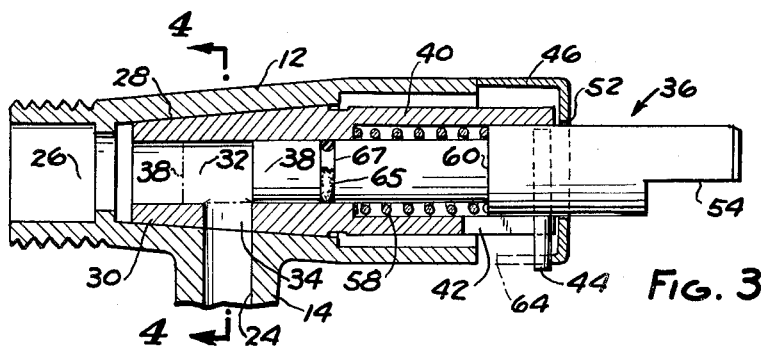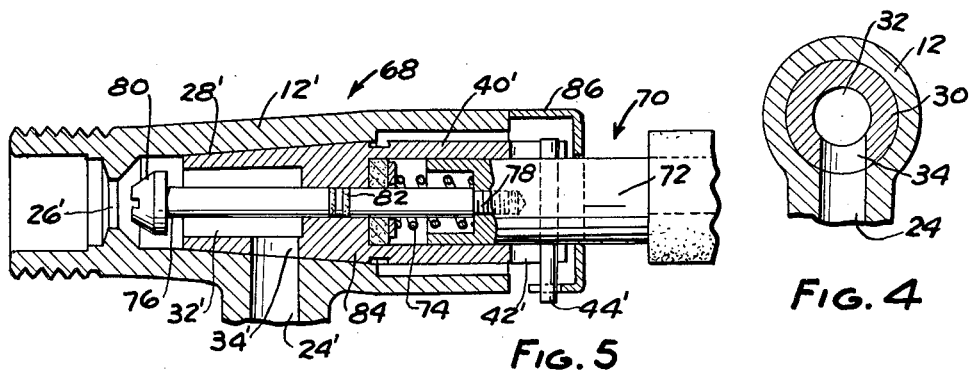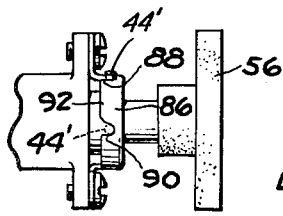

3,012,584
GAS VALVE STRUCTURE
Donald E. Du Perow, Donald E. Blackford, and Everett W. Carlson, Detroit, Mich., assignors to Lincoln Brass Works, Detroit, Mich., a corporation of Michigan
Filed Oct. 1, 1959, Ser. No. 843,698
10 Claims. (Cl. 137—636.4)

This invention relates to a gas valve for use in household gas burning appliances and the like. The valve is especially adapted to use with gas burners such as in broilers or ovens which use relatively large quantities of gas. Such burners require a relatively large flow of gas to initiate combustion. It is possible to open valves used heretofore sufficiently to admit a substantial flow of gas to such a burner without initiating combustion until a dangerous concentration of gas has built up in the oven or broiler. An explosion is possible under these conditions.

An object of this invention is to provide a simple, inexpensive gas valve structure improved so that no gas can pass through it except when it is turned fully to an on position in which sufficient gas to initiate combustion will be supplied to the burner.

Generally the invention is carried out by providing an operating stem which can be moved axially of the valve plug to keep porting in the valve closed while the valve plug is being turned between off position and full on position. The operating stem and valve cap have means which cooperate to control axial movement of the operating stem to keep the valve porting closed when the plug is not at full on position. In the drawings:

FIG. 1 is an elevational view of a gas valve utilizing the present invention.

FIG. 2 is an enlarged fragmentary bottom plan view of the valve exterior in off position.

FIG. 3 is an enlarged generally sectional view on line 3—3 of FIG. 2 showing the valve in on position.

FIG. 4 is a sectional view on line 4—4 of FIG. 3.

FIG. 5 is a view similar to FIG. 3 illustrating a modified form of the invention.

FIG. 6 is a fragmentary bottom plan view of the valve exterior showing the modified form.

The valve 10 shown in FIG. 1 includes a valve body 12 having an inlet fitting 14 threaded for connection into a gas supply conduit 16 and having outlet on fitting 18 threaded for connection to a conventional hood 20 containing an orifice, not shown, for discharging gas into a mixing pipe 22. The inlet fitting contains an inlet passageway 24 and the outlet portion contains an outlet passageway 26 communicating into a tapered valve chamber 28 within which is rotatably seated a valve plug 30 having an axial passageway 32 and a transverse port 34 registrable with inlet 24 to provide a flow of gas from the inlet to outlet 26 in the on position of the valve illustrated in FIG. 3.

An operating stem 36 for the valve has a portion 38 axially slidably engaged within passageway 32. The valve plug has a tubular extension 40 with an axial slot 42 at its outer end. The operating stem projects through extension 40 and has a laterally extending pin 44 fixed thereon and engaging within slot 42. A cap 46 is secured to the valve body by such means as screws 48 threaded into ears 50 on the valve body. The cap has a central aperture 52 through which the operating stem extends and the outer end of the operating stem has a cut away portion 54 providing a non-circular insert for engagement within a complementary opening in an operating handle 56. A spring 58 within valve plug extension 40 is stressed to urge the valve plug into seated relation in chamber 28 and the spring reacts against a shoulder 60 on the operating stem to hold it yieldably in the FIG. 3 position. Cap 46, by engagement with pin 44, secures the parts in assembled relation.

Cap 46 has an axial slot 62 within which pin 44 engages in off position of the valve. Adjacent slot 62 the cap has a circumferentially extending shoulder 64 and at the opposite end of the shoulder from slot 62 is an axially relieved portion 66. A seal is provided between operating stem 36 and the wall of passageway 32 and for this purpose it has been found advantageous to use an O-ring 65 contained in a groove 67 in the operating stem and engaging the passageway wall.

In use it may be assumed that the valve is initially in off position with port 34 rotated out of registry with inlet 24. The outwardly projecting end of pin 44 is engaged in slot 62 as illustrated in FIGS. 1 and 2 and the operating stem is retracted to the right to the solid line position illustrated in FIG. 3. To turn the valve on, operating handle 56 is first manually forced inwardly or to the left as the drawings are viewed, against the action of spring 58 until the outer end of pin 44 clears slot 62. The operating handle is then turned to bring port 34 into registry with inlet 24. Upon the inward shifting of the operating handle, portion 38 of the operating stem is shifted to the left so that it closes port 34. The position of the inlet end of the operating stem when it closes port 34 is illustrated by broken lines 38 in FIG. 3.

During turning of the valve from off position to on position, shoulder 64 prevents pin 44 for returning to the right for opening port 34. Pin 44 can not return until it clears shoulder 64 for dropping into relieved portion 66 of the valve cap. When the pin thus clears shoulder 64, port 34 is already fully registered with inlet 24. Spring 58 thereupon snaps pin 44 and the operating stem to the right, thus rapidly withdrawing portion 38 from registry with port 34 and instantaneously opening the valve so that a full flow of gas flows from inlet 24 to outlet 26.

To close the valve, the reverse process is employed. Operating handle 56 is first pushed in axially to immediately close port 34. The handle is then turned to remove port 34 from registry with inlet 24 and during this turning movement, port 34 remains entirely closed by portion 38 of the valve stem until full off position of the valve is reached and pin 44 snaps back into recess 62.

Thus there is no on position of the valve between the full off position and the position at which sufficient gas will be supplied to the burner to initiate combustion.

The valve 68 shown in FIGS. 5 and 6 is similar to the form described above except that the axially shiftable valve stem 70 is arranged to close outlet passageway 26' in the valve body rather than port 34' in the valve plug. In this form of the invention, the operating stem 70 includes an outer portion 72 to which pin 44' is secured and against which spring 74 reacts. A rod like portion 76 is threadedly secured to portion 72 as at 78 and has at its inner end a head 80 arranged to close outlet opening 26'. An intermediate portion of rod 76 is grooved to receive O-rings 82 which sealingly engage the adjacent wall of valve plug 84. Valve cap 86 has axial recesses 88 and 90 and an intermediate circumferential shoulder 92 engaged by the outer end of pin 44' in the various positions of the valve.

Operation of this form of valve is similar to that described above. To turn the valve from off position to on position, operating handle 56 is forced inwardly to disengage pin 44' from slot 88. Then the operating handle is turned to bring port 34' into registry with inlet 24'. When the operating handle is pushed inwardly, head 80 advances axially into sealing engagement with outlet port 26' in the valve body and head 80 is prevented from unseating from the outlet port by engagement of shoulder 92 with pin 44' until port 34' is fully registered with inlet 24'. At this time, pin 44' is aligned with recess 90 and spring 74 snaps the operating stem outwardly, thereby instantaneously retracting seal 80 from port 26' and opening the valve to a flow of gas. To close the valve, the operating handle is pushed inwardly to again seal outlet port 26', and is turned until port 34' is completely out of registry with inlet 24' at which time spring 74 snaps pin 44' into recess 88.

In this form of the invention, similar to the above described form, no flow of gas is possible through the valve except a full flow sufficient to initiate combustion.

It will be appreciated that this construction can be used effectively in valves ported to provide more than one rate of flow provided that the porting be kept closed by axial manipulation of the operating stem while the valve plug is being turned to and from an on position in which sufficient gas is supplied to the burned to initiate combustion.

We claim:

1. A valve for controlling the flow of gas to a burner comprising, a chambered body with inlet and outlet porting communicating into the chamber, a ported valve plug in said chamber rotatable to an on position for passing gas from the inlet to the outlet and to an off position, said valve plug including an axially recessed portion accessible from the exterior of said chamber, an operating stem having a lateral projection engaging within the recess to form an operating connection between said stem and plug for turning the latter, means forming a cap securing said valve plug to said valve body, said cap having an axially extending portion defining a generally circumferential shoulder flanked by generally axially relieved portions, said projection engaging said first relieved portion in said off position of the valve to secure said valve stem and valve plug against rotation, said projection being axially movable in said first relieved portion and in said recess in the valve plug so that said valve stem can be moved axially to clear said projection from said first relieved portion and thereby free said stem and plug for turning to said on position, said stem including valve means operative responsive to the axial shifting thereof to close the porting between said inlet and outlet, said shoulder being positioned to obstruct return axial shifting of said projection and operating stem in positions of the valve plug between said off position and fully on position, said second relieved portion being positioned to receive said projection when said valve plug has been turned fully to said on position so that said projection and valve stem can be axially returned, said valve means being operable responsive to return movement of said stem to open porting between said inlet and outlet.

2. A valve for controlling the flow of gas to a burner comprising, a chambered body with inlet and outlet porting communicating into the chamber, a ported valve plug in said chamber rotatable to an on position for passing gas from the inlet to the outlet and to an off position, said valve plug including an axially recessed portion accessible from the exterior of said chamber, an operating stem having a lateral projection engaging within the recess to form an operating connection between said stem and plug for turning the latter, means forming a cap securing said valve plug to said valve body, said cap having an axially extending portion defining a generally circumferential shoulder flanked by generally axially relieved portions, said projection engaging said first relieved portion in said off position of the valve to secure said valve stem and valve plug against rotation, said projection being axially movable in said first relieved portion and in said recess in the valve plug so that said valve stem can be moved axially to clear said projection from said first relieved portion and thereby free said stem and plug for turning to said on position, said stem including valve means operative responsive to the axial shifting thereof to close the porting between said inlet and outlet, said shoulder being positioned to obstruct return axial shifting of said projection and operating stem in positions of the valve plug between said off position and fully on position, said second relieved portion being positioned to receive said projection when said valve plug has been turned fully to said on position so that said projection and valve stem can be axially returned, said valve means being operable responsive to return movement of said stem to open porting between said inlet and outlet, and a spring stressed to urge said valve plug toward seated relation in said chamber, said spring reacting against said operating stem to snap the same in said return movement thereof for instaneously opening said porting between said inlet and outlet.

3. A valve for controlling the flow of gas to a burner comprising, a chambered body with inlet and outlet porting communicating into the chamber, a ported valve plug in said chamber rotatable to an on position for passing gas from the inlet to the outlet, and to an off position, an operating stem, means operably interconnecting said stem and valve plug for turning said valve plug and means facilitating axial shifting of said stem relative to said valve plug, means restraining relative rotation of said valve plug in said on and off positions thereof, said restraining means being releasable responsive to axial shifting movement of said stem to free said valve plug for rotation, valve means operable responsive to said axial movement of said stem to close porting between said inlet and outlet, means restraining return axial movement of said valve stem in rotative positions of said valve plug between said on and off positions thereof, so that gas flows through said valve only when said plug is substantially fully at said on position.

4. The combination defined in claim 3 characterized in that said valve plug has an axial passageway, said stem being slidably shiftable relative to said valve plug and having an end portion projecting into said passageway, said valve means comprising a portion of said stem adjacent said end portion thereof.

5. The combination defined in claim 3 characterized in that said valve plug has an axial passageway communicating with said outlet in said body and has a transverse port communicating with said axial passageway and being registrable with said inlet in said valve body in an on position of the valve, said operating stem being slidably shiftable relative to said valve plug and having a portion providing said valve means projecting into said axial passageway, said valve means being shiftable to and from closing relation to said transverse port responsive to axial movements of said valve stem.

6. The combination defined in claim 3 characterized in that said valve plug has an axial passageway communicating with said outlet in said valve body, said operating stem being slidably shiftable relative to said valve plug and having an end portion providing said valve means projecting into said passageway, said end portion being movable to and from closing relation to said outlet in said valve body responsive to axial movements of said operating stem.

7. The combination defined in claim 3 wherein said valve plug has a central axial passageway for passing gas between said inlet and outlet, said passageway having an extension, said operating stem having a portion axially slidably shiftable within said extension and having another portion providing said valve means projecting into said passageway, and O-ring means sealingly interposed between the wall of said extension and the first mentioned portion of said operating stem.

8. The combination defined in claim 3 wherein said means operably interconnecting said stem and valve plug and said means facilitating relative axial shifting thereof comprises, means providing on said members a lateral projection engaged within an axial recess, interengagement of the recess and projection forming a driving connection between said operating stem and valve plug, said projection being axially shiftable in said recess.

9. The combination defined in claim 8 wherein said rotation restraining means includes axially recessed means on said valve body engaged by said lateral projection in said on and off positions of said valve plug.

10. The combination defined in claim 9 wherein said means restraining return axial movement of said valve stem includes a circumferential shoulder extending between said recessed means on said valve body and engaged by said lateral projection in positions intermediate said on and off positions.

References Cited in the file of this patent

UNITED STATES PATENTS

| | | |
|---|---|---|
| 1,091,108 | Allen | Mar. 24, 1914 |
| 1,933,177 | Kindl | Oct. 31, 1933 |
| 2,636,505 | Paille | Apr. 28, 1953 |